(12) United States Patent
Marlier et al.

(10) Patent No.: US 10,906,522 B2
(45) Date of Patent: Feb. 2, 2021

(54) ROAD VEHICLE WITH DUAL-CLUTCH TRANSMISSION AND HYBRID DRIVE AND RELATIVE CONTROL METHOD

(71) Applicant: FERRARI S.p.A., Modena (IT)

(72) Inventors: Renaud Marlier, Modena (IT); Andrea Pezzati, Scandicci (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 16/434,902

(22) Filed: Jun. 7, 2019

(65) Prior Publication Data

US 2019/0389447 A1 Dec. 26, 2019

(30) Foreign Application Priority Data

Jun. 11, 2018 (IT) .................. 102018000006198

(51) Int. Cl.
*B60W 10/113* (2012.01)
*B60W 20/20* (2016.01)
(Continued)

(52) U.S. Cl.
CPC .......... *B60W 10/113* (2013.01); *B60W 20/20* (2013.01); *F16H 3/001* (2013.01); *F16H 37/065* (2013.01); *F16H 2003/007* (2013.01)

(58) Field of Classification Search
CPC ........ F16H 3/001; F16H 37/065; F16H 3/006; B60W 10/113; B60K 2006/541;
(Continued)

(56) References Cited

U.S. PATENT DOCUMENTS 3,744,760 A * 7/1973 Uher ................. B66D 1/72
254/351
2007/0227282 A1 10/2007 Forsyth
(Continued)

FOREIGN PATENT DOCUMENTS

CN 201448405 U 5/2010
DE 102006036758 A1 2/2008
(Continued)

OTHER PUBLICATIONS

Search Report issued in Italian Application No. 201800006198, completed Feb. 7, 2019; 10 pages.

*Primary Examiner* — Roger L Pang
(74) *Attorney, Agent, or Firm* — Cantor Colburn LLP

(57) ABSTRACT

A road vehicle with hybrid drive having: at least one pair of drive wheels; an internal combustion engine; a reversible electric machine; and a dual-clutch transmission. The dual-clutch transmission has: a first primary shaft and a second primary shaft; a first clutch interposed between the internal combustion engine and the first primary shaft; and a second clutch interposed between the internal combustion engine and the second primary shaft; a third clutch, which is interposed between a shaft of the electric machine and the first primary shaft so as to connect/disconnect the shaft of the electric machine to/from the first primary shaft; and a fourth clutch, which is interposed between the shaft of the electric machine and the second primary shaft so as to connect/disconnect the shaft of the electric machine to/from the second primary shaft.

25 Claims, 4 Drawing Sheets

(51) Int. Cl.
*F16H 3/00* (2006.01)
*F16H 37/06* (2006.01)

(58) Field of Classification Search
CPC .... B60K 2006/4825; B60K 6/48; B60K 6/36; B60K 6/547
USPC .................................................. 74/329, 330
See application file for complete search history.

(56) References Cited

U.S. PATENT DOCUMENTS

2010/0314185 A1* 12/2010 Schoenek ................ B60K 6/48
 180/65.7
2011/0198139 A1* 8/2011 Fuechtner ................ F16H 3/10
 180/65.25

FOREIGN PATENT DOCUMENTS

| | | | | |
|---|---|---|---|---|
| DE | 102015013528 | B3 | 1/2017 | |
| EP | 2662594 | A1 * | 11/2013 | ............ F16H 3/006 |
| GB | 2506601 | A | 4/2014 | |
| GB | 2522706 | | 8/2015 | |
| JP | 2009173204 | A | 8/2009 | |

* cited by examiner

ROAD VEHICLE WITH DUAL-CLUTCH TRANSMISSION AND HYBRID DRIVE AND RELATIVE CONTROL METHOD

CROSS-REFERENCE TO RELATED APPLICATIONS

This Patent application claims priority from Italian Patent Application No. 102018000006198 filed on Jun. 11, 2018, the entire disclosure of which is incorporated herein by reference.

TECHNICAL FIELD

The invention relates to a road vehicle with dual-clutch transmission and hybrid drive and to a relative control method.

PRIOR ART

A hybrid vehicle comprises an internal combustion engine, which transmits a torque to the drive wheels by means of a drivetrain provided with a transmission, and at least one electric machine, which is electrically connected to a power storage system and is mechanically connected to the drive wheels.

When the vehicle is driving, the following operating modes are possible: a thermal operating mode, in which the torque is generated only by the combustion engine and, if necessary, the electric machine acts like a generator in order to charge the power storage system; an electric operating mode, in which the combustion engine is off and the torque is generated only by the electric machine operating as motor; or a combined operating mode, in which the torque is generated both by the combustion engine and by the electric machine operating as motor. Furthermore, in order to increase the total energetic efficiency during all deceleration phases, the electric machine can be used as generator in order to obtain a regenerative deceleration, in which the kinetic energy owned by the vehicle, instead of being completely dissipated in frictions, in partly turned into electric energy, which is stored in the power storage system, The arrangement of the electric machine inside the vehicle and, as a consequence, the mechanical connection of the electric machine to the drive wheels can be very complicated in an existing vehicle, as, in an existing vehicle which was not specifically designed for a hybrid drive, it usually is very hard to find the space needed to accommodate the electric machine. As a consequence, it often is impossible to change an existing vehicle in order to turn it into a hybrid vehicle; this condition is particularly limiting because it does not allow manufacturers to produce a hybrid vehicle starting from a conventional, existing vehicle, but requires a completely new designing of the hybrid vehicle. Consequently, the designing and developing costs to be borne by manufacturers to produce a hybrid vehicle are very high and, in turn, make the selling costs of hybrid vehicles not very convenient from an economic point of view.

Patent applications US2005139035A1, US2002033059A1, US2008142283A1, DE102005004207A1 and DE102006059664A1 describe a dual-clutch transmission for a hybrid vehicle, in which one of the two primary shafts of the dual-clutch transmission is angularly integral to the rotor of a reversible electric machine.

Patent application EP2216193A1 discloses a dual-clutch transmission for a hybrid vehicle, in which a first reversible electric machine is mechanically connected to a first primary shaft of the transmission and a second reversible electric machine is mechanically connected to a second primary shaft of the transmission; there a plurality of rotary fluid-dynamic machines, each providing the road vehicle with an auxiliary service and equipped with a rotary shaft, which is connected to at least one of the two reversible electric machines.

Patent applications GB2506601A, DE102006036758A1, GB2522706A and JP2009173204A1 describe a road vehicle with a dual-clutch transmission and with a hybrid drive; the dual-clutch transmission comprises a first pair of clutches interposed between the shaft of the internal combustion engine and the two primary shafts of the transmission and a second pair of clutches interposed between the shaft of the electric machine and the two primary shafts of the transmission.

DESCRIPTION OF THE INVENTION

The object of the invention is to provide a road vehicle with a dual-clutch transmission and with a hybrid drive, said road vehicle further reducing the dimensions and the masses of the powertrain system and being, at the same time, easy and economic to be manufactured.

According to the invention, there is provided a road vehicle with a dual-clutch transmission and with a hybrid drive as claimed in the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
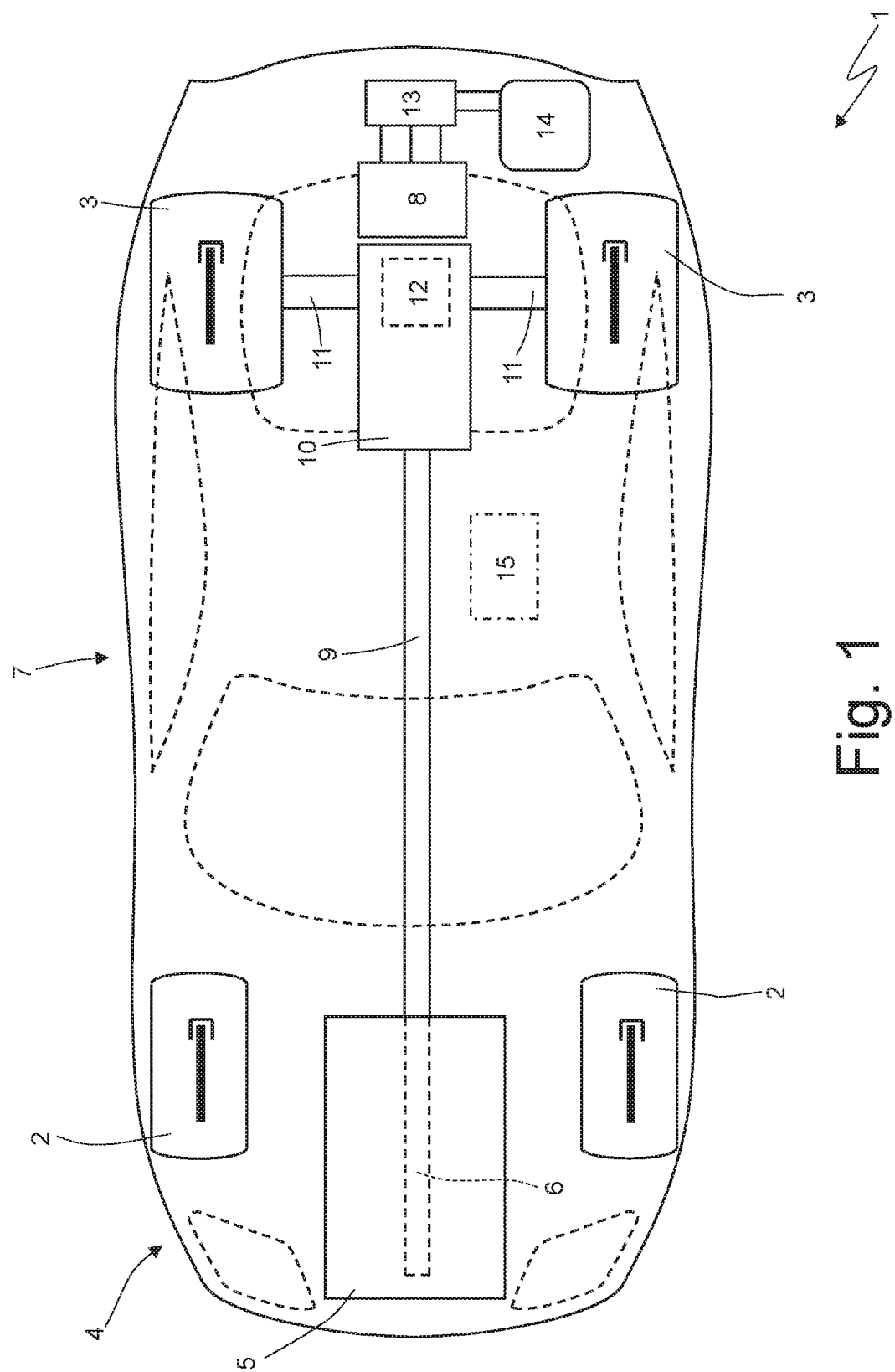
FIG. 1 is a schematic view of a road vehicle with a dual-clutch transmission and with a hybrid drive.

In FIG. 1, number 1 indicates, as a whole, a road vehicle with a dual-clutch transmission and with a hybrid drive, which is provided with two front wheels 2 and two rear drive wheels 3, which receive the torque from a hybrid powertrain system 4.

The hybrid powertrain system 4 comprises an internal combustion heat engine 5, which is arranged in a front position and is provided with a crankshaft 6, and a servo-controlled transmission 7, which transmits the torque generated by the internal combustion heat engine 5 to the rear drive wheels 3. The hybrid powertrain system 4 further comprises a reversible electric machine 8 (i.e. which can work both as an electric motor, thus absorbing electric energy and generating a mechanical torque, and as an electric generator, thus absorbing mechanical energy and generating electric energy), which is mechanically connected to the servo-controlled transmission 7.

The servo-controlled transmission 7 comprises a drive shaft 9, which, on one side, is angularly integral to the crankshaft 6 and, on the other side, is mechanically connected to a servo-controlled dual-clutch transmission 10, which is arranged in a rear position and transmits the motion to the rear drive wheels 3 by means of two axle shafts 11, which receive the motion from a differential 12. The main reversible electric machine 8 is mechanically connected to the duel-clutch transmission 10, as explained more in detail below, and is controlled by an electronic power converter 13, which is connected to a power storage system 14 typically consisting of a pack of chemical batteries, which, if necessary, are connected in parallel to one or more supercapacitors.

The powertrain system 4 is controlled by an electronic control unit 15, which, among other things, regulates the generation of the torque of the internal combustion heat engine 5, the generation/absorption of torque of the electric machine 8 and the engagements of the gears in the transmission 10.

Figure 2:
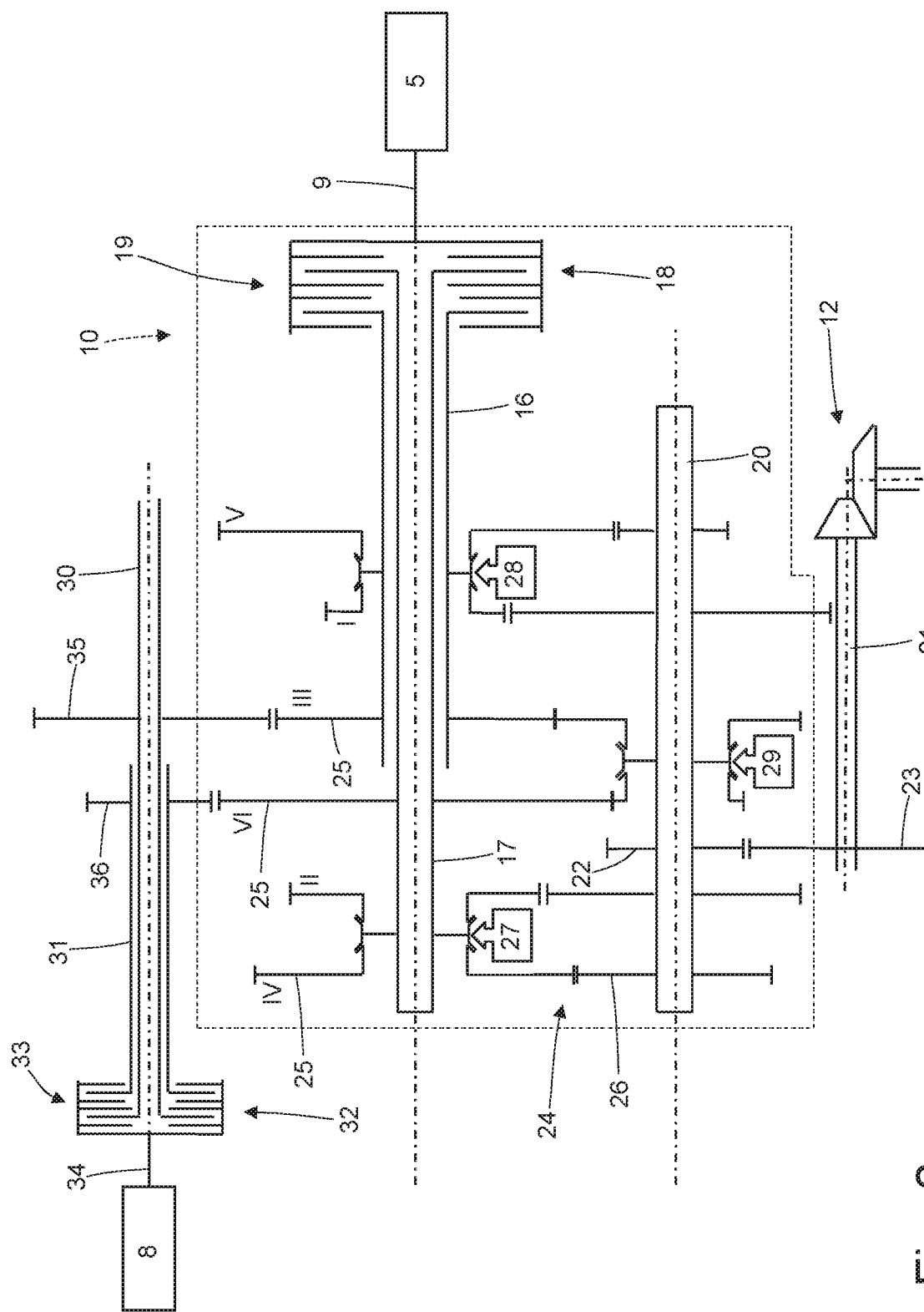
FIG. 2 is a schematic view of a hybrid powertrain system of the road vehicle of FIG. 1, which is not manufactured according to the invention.

According to FIG. 2, the dual-clutch transmission 10 comprises two primary shafts 16 and 17, which are coaxial to one another, independent and inserted inside one one another, and two coaxial clutches 18 and 19 arranged in series, each designed to connect a respective primary shaft 16 or 17 to the drive shaft 9 (hence, to the crankshaft 6 of the internal combustion heat engine 5, as the drive shaft 9 actually is an extension of the crankshaft 6). In other words, each clutch 18 or 19 is designed to connect/disconnect the primary shaft 16 or 17 to/from the drive shaft 9 (hence, to/from the crankshaft 6 of the internal combustion heat engine 5). Furthermore, the dual-clutch transmission 10 comprises a secondary shaft 20, which is angularly integral to an input shaft 21 of the differential 12, which transmits the motion to the rear drive wheels 3 through the two axle shafts 11; in particular, there is a gear wheel 22, which is splined to the secondary shaft 20 and permanently meshes with a gear wheel 23, which is splined to the input shaft 21 of the differential 12 (the two gear wheels 22 and 23 form a gearing, which makes the secondary shaft 20 angularly integral to the input shaft 21).

The single-clutch transmission 10 shown in FIG. 2 has six forward gears indicated with Roman numerals (first gear I, second gear II, third gear III, fourth gear IV, fifth gear V and sixth gear VI); the transmission 10 has no reverse gear, since the reverse gear is obtained in electric drive reversing the direction of rotation of the electric machine 8. Each primary shaft 16 or 17 is mechanically coupled to the secondary shaft 20 by means of a plurality of gearings 24, each defining a respective gear and comprising a primary gear wheel 25, which is mounted on the primary shaft 16 or 17, and a secondary gear wheel 26, which is mounted on the secondary shaft 20 and permanently meshes with the primary gear wheel 25.

In the embodiment shown in FIG. 2, the two secondary gear wheels 26 of the second gear II and of the fourth gear IV are arranged beside one another and are splined to the secondary shaft 20 so as to always rotate in an integral manner with the secondary shaft 20; the two primary gear wheels 25 of the second gear II and of the fourth gear IV are mounted idle on the primary shaft 17 (for example, through the interposition of corresponding ball bearings). The dual-clutch transmission 10 comprises a synchronizer 27, which is arranged between the two primary gear wheels 25 of the second gear II and of the fourth gear IV, is mounted coaxial to the primary shaft 17 and is designed to be operated so as to (alternatively) fit one of the two primary gear wheels 25 of the second gear II and of the fourth gear IV to the primary shaft 17.

In the embodiment shown in FIG. 2, the two secondary gear wheels 26 of the first gear I and of the fifth gear V are arranged beside one another and are splined to the secondary shaft 20 so as to always rotate in an integral manner with the secondary shaft 20; the two primary gear wheels 25 of the first gear I and of the fifth gear V are mounted idle on the primary shaft 16 (for example, through the interposition of corresponding ball bearings). The dual-clutch transmission 10 comprises a synchronizer 28, which is arranged between the two primary gear wheels 25 of the first gear I and of the fifth gear V, is mounted coaxial to the primary shaft 16 and is designed to be operated so as to (alternatively) fit one of the two primary gear wheels 25 of the first gear I and of the fifth gear V to the primary shaft 16.

In the embodiment shown in FIG. 2, the two primary gear wheels 25 of the sixth gear VI and of the third gear III are arranged beside one another and are splined to the primary shaft 17 and to the primary shaft 16, respectively, so as to always rotate in an integral manner with the primary shaft 16 or 17 (namely, the primary gear wheel 25 of the sixth gear IV is splined to the primary shaft 17 and the primary gear wheel 25 of the third gear III is splined to the primary shaft 16); the two secondary gear wheels 26 of the sixth gear VI and of the third gear III are mounted idle on the secondary shaft 20 (for example, through the interposition of corresponding ball bearings). The dual-clutch transmission 10 comprises a synchronizer 29, which is arranged between the two secondary gear wheels 26 of the sixth gear VI and of the third gear III, is mounted coaxial to the secondary shaft 20 and is designed to be operated so as to (alternatively) fit one of the two secondary gear wheels 26 of the sixth gear VI and of the third gear III to the secondary shaft 20.

According to a different—though perfectly equivalent—embodiment which is not shown herein, the two synchronizers 27 and 28 are moved from the primary shafts 16 and 17 to the secondary shaft 20: in this embodiment, all primary gear wheels 25 are splined to the corresponding primary shafts 16 and 17 so as to always rotate in an integral manner with the primary shafts 16 and 17, whereas the secondary gear wheels 26 are mounted idle on the secondary shaft 20 and are fitted to the secondary shaft 20 by the synchronizers 27, 28 and 29.

The dual-clutch transmission 10 comprises two connection shafts 30 and 31, which are coaxial to one another, independent and inserted inside one another, and two coaxial clutches 32 and 33 arranged in series, each designed to connect a respective connection shaft 30 or 31 to a shaft 34 of the electric machine 8. In other words, each clutch 32 or 33 is designed to connect/disconnect the connection shaft 30 or 31 to/from the shaft 34 of the electric machine 8. The connection shaft 30 is permanently connected to the primary shaft 16 through a gearing consisting of a gear wheel 35, which is splined to the connection shaft 30, and of the primary gear wheel 25 of the third gear III, which is splined to the primary shaft 16 and permanently meshes with the gear wheel 35; in other words, a primary gear wheel 25 (in particular, the primary gear wheel 25 defining the third gear III) fulfils a double function: defining a gear of the transmission 10 and creating the permanent connection between the connection shaft 30 and the primary shaft 16. The connection shaft 31 is permanently connected to the primary shaft 17 through a gearing consisting of a gear wheel 36, which is splined to the connection shaft 31, and of the primary gear wheel 25 of the sixth gear VI, which is splined to the primary shaft 17 and permanently meshes with the gear wheel 36; in other words, a primary gear wheel 25 (in particular, the primary gear wheel 25 defining the sixth gear VI) fulfils a double function: defining a gear of the transmission 10 and creating the permanent connection between the connection shaft 31 and the primary shaft 17.

It should be pointed out that the rotation speed of the shaft 34 of the electric machine 8 always is a function (through the gear ratio of the gearing consisting of the gear wheel 35 and of the corresponding primary gear wheel 25 or through the gear ratio of the gearing consisting of the gear wheel 36 and of the corresponding primary gear wheel 25) of the speed of the primary shaft 16 or 17. As a consequence, the shaft 34 of the electric machine 8 is always connected to the rear drive wheels 3 through the gear ratio set by the gear engaged.

According to a preferred embodiment, the gear ratio of the gearing consisting of the gear wheel 35 and of the corresponding primary gear wheel 25 is similar (even equal) to the gear ratio of the gearing consisting of the gear wheel 36 and of the corresponding primary gear wheel 25, so that, given the same rotation speed of the primary shafts 16 and 17, the shaft 34 of the electric machine 8 rotates (approximately) with the same rotation speed both when it is connected to the primary shaft 16 and when it is connected to the primary shaft 17. According to a preferred embodiment, the gearing consisting of the gear wheels 35 and 25 and the gearing consisting of the gear wheels 36 and 25, which (indirectly) connect the shaft 34 of the electric machine 8 to the primary shafts 16 and 17, cause the shaft 34 of the electric machine 8 to rotate faster than the primary shafts 16 and 17 with a gear ratio of approximately 1:3; in this way, the rpm of the internal combustion heat engine 5 generally ranges from 1,000 to 9,000-10,000 revolutions/minute and the rpm of the electric machine 8 generally ranges from 3,000 to 29,000-32,000 revolutions/minute (by so doing, an electric machine 8 is obtained, which has a smaller diameter than the axial length, thus optimizing mass and dimensions).

The operation of the dual-clutch transmission 10, in terms of transmission of the torque generated by the internal combustion heat engine 5 to the rear drive wheels 3 (namely, towards the input shaft 21 of the differential 12), is completely conventional.

By opening both clutches 32 and 33 (i.e. by keeping both clutches 32 and 33 open), the shaft 34 of the electric machine 8 can be isolated (separated) from the primary shafts 16 and 17 so as to leave out the electric machine 8 (in this case, the drive is a merely thermal drive as it is completely carried out by the internal combustion heat engine 5).

By closing one of the two clutches 32 and 33 (obviously, the other clutch 33 or 32 must remain open), the shaft 34 of the electric machine 8 can be connected to the primary shaft 16 or to the primary shaft 17. In this way, the shaft 34 of the electric machine 8 can always be connected to the primary shaft 16 or 17 which is currently connected to the rear drive wheels 3 (namely, with the input shaft 21 of the differential 12). In other words, during gear shifts, the clutch 18 or 19 is opened and, at the same time, the other clutch 19 or 18 is closed, so as to cyclically change the primary shaft 16 or 17 which is currently connected to the rear drive wheels 3; in order to keep the shaft 34 of the electric machine 8 connected to the rear drive wheels 3 (obviously, only when the electric machine 8 is used), the clutch 32 or 33 needs to be opened and, at the same time, the other clutch 33 or 32 needs to be closed with every gear shift.

When the internal combustion heat engine 5 is on and generates a torque, one of the two clutches 18 or 19 is always closed so as to allow the torque generated by the internal combustion heat engine 5 to reach the differential 12 (and, hence, the rear drive wheels 3) and/or the electric machine 8. When the internal combustion heat engine 5 is on and the clutch 17 is closed, the electric machine 8 can be off (and disengaged by opening both clutches 32 and 33), can act like a motor to provide a torque "boost", which is added to the torque generated by the internal combustion heat engine 5, or can act like a generator in order to absorb part of the torque generated by the internal combustion heat engine 5 and, hence, generate electrical power to charge, when needed, the storage system 14.

When the internal combustion heat engine 5 does not need to generate a torque, the internal combustion heat engine 5 is turned off and both clutches 18 and 19 are opened (hence, mechanically disconnecting the internal combustion heat engine 5 from the transmission 10). When the internal combustion heat engine 5 is off and the clutches 18 and 19 are open, the electric machine 8 can act like a motor so as to drive (forward or in reverse) the road vehicle 1 or the electric machine 8 can act like a generator to slow down the road vehicle 1 carrying out a regenerative braking.

In any condition (internal combustion heat engine 5 on/off and electric machine 8 on/off), the transmission 10 engages the gear that allows the internal combustion engine 5 and/or the electric machine 8 to operate at the ideal rpm (namely, the number of revolutions per minute that maximizes energetic efficiency or performances depending on the type of driving mode requested by the driver).

The internal combustion heat engine 5 can be started by the electric machine 8 operating as motor both when the road vehicle 1 is moving and when the road vehicle 1 is still. When the road vehicle 1 is moving, the primary shaft 16 or is obviously rotating and the clutch 18 or 19 is progressively closed (at the same time, there is an increase in the torque delivered by the electric machine 8 to cause the rotation of the crankshaft 6 of the internal combustion engine 5). When the road vehicle 1 is still, a jump start is preferred (though, it is not compulsory), which involves causing the rotation of the primary shaft 16 or 17 with the clutches 18 and 19 open and, then, progressively closing the clutch 18 or 19 when the primary shaft 16 or 17 reaches a predetermined starting speed.

Basically, in the transmission 10, the gearings 24 establishing the gears (each one by connecting a primary shaft 16 or 17 to the secondary shaft 20) are shared by the internal combustion heat engine 5 (which is connected to the two primary shafts 16 and 17 through the two clutches 18 and 19) and by the electric machine 8 (which is connected to the two primary shafts 16 and 17 through the two clutches 32 and 33); in this way, the gearings 24 establishing the gears (each one by connecting a primary shaft 16 or 17 to the secondary shaft 20) can be used only by the internal combustion heat engine 5 (keeping both clutches 32 and 33 open), only by the electric machine 8 (keeping both clutches 18 and 19 open) or simultaneously by the internal combustion heat engine 5 and by the electric machine 8 (closing one of the two clutches 18 and 19 and one of the two clutches 32 and 33). In this way, one single electric machine 8 can be mechanically connected to the transmission 10 and can always (though not necessarily) be used in all possible operating modes, however maintaining a number or revolutions per minute which is not too large (a condition which turns out to be indispensable in order to avoid an excessively complicated and expensive mechanical construction of the electric machine 8).

In the embodiment shown in FIG. 2, the shaft 34 of the electric machine 8 is directly connected to the two clutches 32 and 33 and there are two connection shafts 30 and 31, each angularly integral to a corresponding primary shaft 16 and 17; in this embodiment, the two clutches 18 and 19 are coupled to one another (namely, are mounted together so as to form one single unit), the two clutches 32 and 33 are coupled to one another (namely, are mounted together so as to form one single unit) and the two clutches 18 and 19 are not coaxial to the two clutches 32 and 33.

Figure 3:
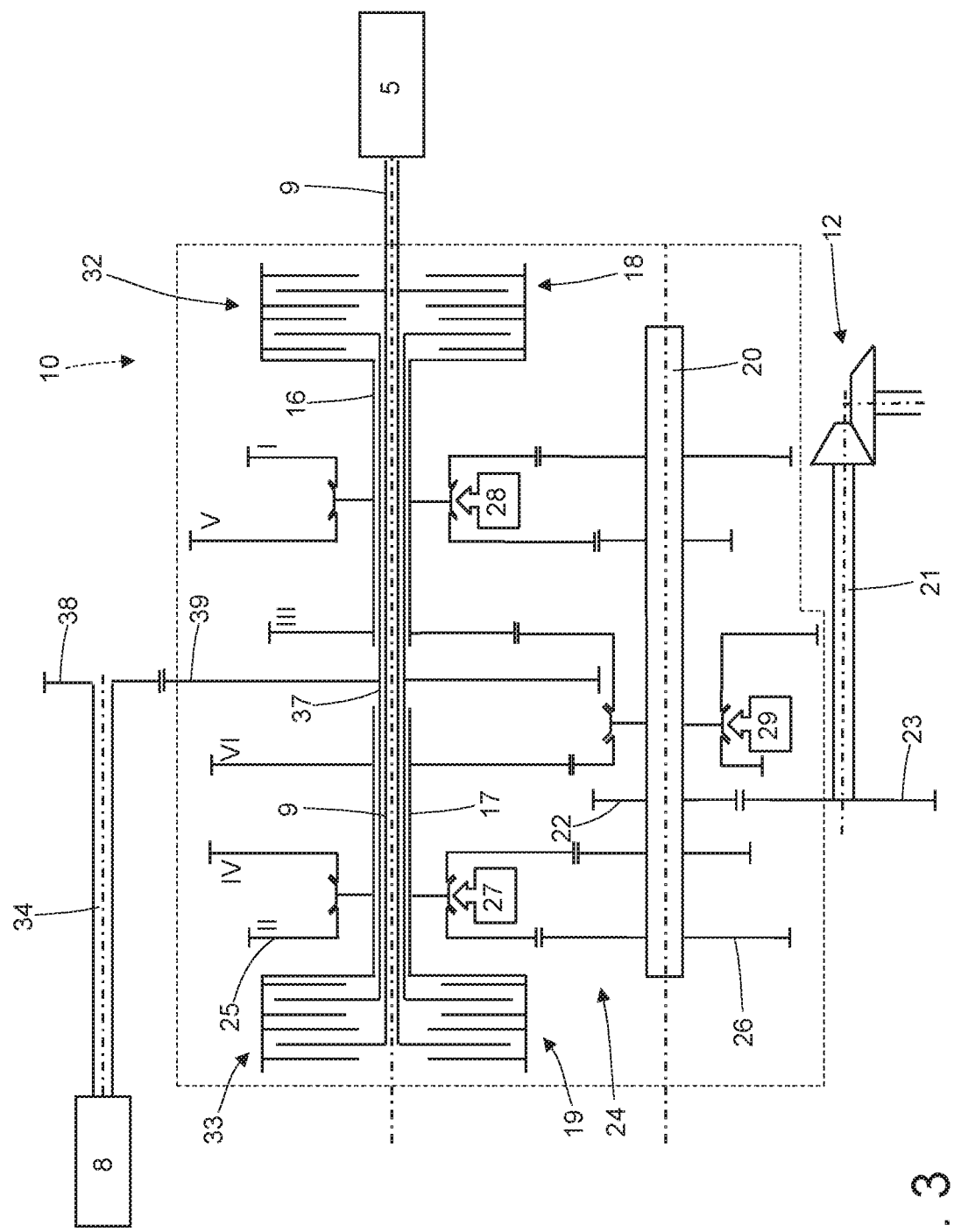
FIGS. 3 and 4 are two schematic views of two corresponding variants of the hybrid powertrain system of FIG. 2, which are manufactured according to the invention.

In the embodiment shown in FIG. 3, the shaft 34 of the electric machine 8 is connected to an intermediate shaft 37 by means of a gear wheel 38, which is splined to the shaft 34 and permanently meshes with a gear wheel 39, which is splined to the intermediate shaft 37 (the two gear wheels 38 and 39 build a gearing, which makes the shaft 34 angularly integral to the intermediate shaft 37). According to a preferred embodiment, the gearing consisting of the gear wheels 38 and 39, which connects the shaft 34 of the electric machine 8 to the intermediate shaft 37, causes the shaft 34 of the electric machine 8 to rotate faster than the intermediate shaft 37 with a gear ratio of approximately 1:3; in this way, the rpm of the internal combustion heat engine 5 generally ranges from 1,000 to 9,000-10,000 revolutions/minute, whereas and the rpm of the electric machine 8 generally ranges from 3,000 to 27,000-30,000 revolutions/minute.

In the embodiment shown in FIG. 3, the intermediate shaft 37 is coaxial to the primary shafts 16 and 17 and, hence, is also coaxial to the drive shaft 9; in particular, the primary shafts 16 and 17 and also the intermediate shaft 37 are hollow on the inside, so that the drive shaft 9 is arranged inside the primary shafts 16 and 17 and the intermediate shaft 37, so that the intermediate shaft 37 is arranged inside the primary shafts 16 and 17 and so that the two primary shafts 16 and 17 have the same outer diameter and are coaxial to one another as well as face one another head to head at a given distance from one another (in the space left free by the primary shafts 16 and 17 there is the gear wheel 39 splined to the intermediate shaft 37).

In the embodiment shown in FIG. 3, the two clutches 18 and 32 connect the drive shaft 9 and the intermediate shaft 37, respectively, to the primary shaft 16 and are coupled to one another (namely, are mounted together so as to form one single unit); similarly, the two clutches 19 and 33 connect the drive shaft 9 and the intermediate shaft 37, respectively, to the primary shaft 17 and are coupled to one another (namely, are mounted together so as to form one single unit). As a consequence, the two clutches 18 and 32 are coaxial to the two clutches 19 and 33. In the embodiment shown in FIG. 3, the two clutches 18 and 32 and the two clutches 19 and 33 are arranged at opposite ends of the intermediate shaft 37.

Figure 4:
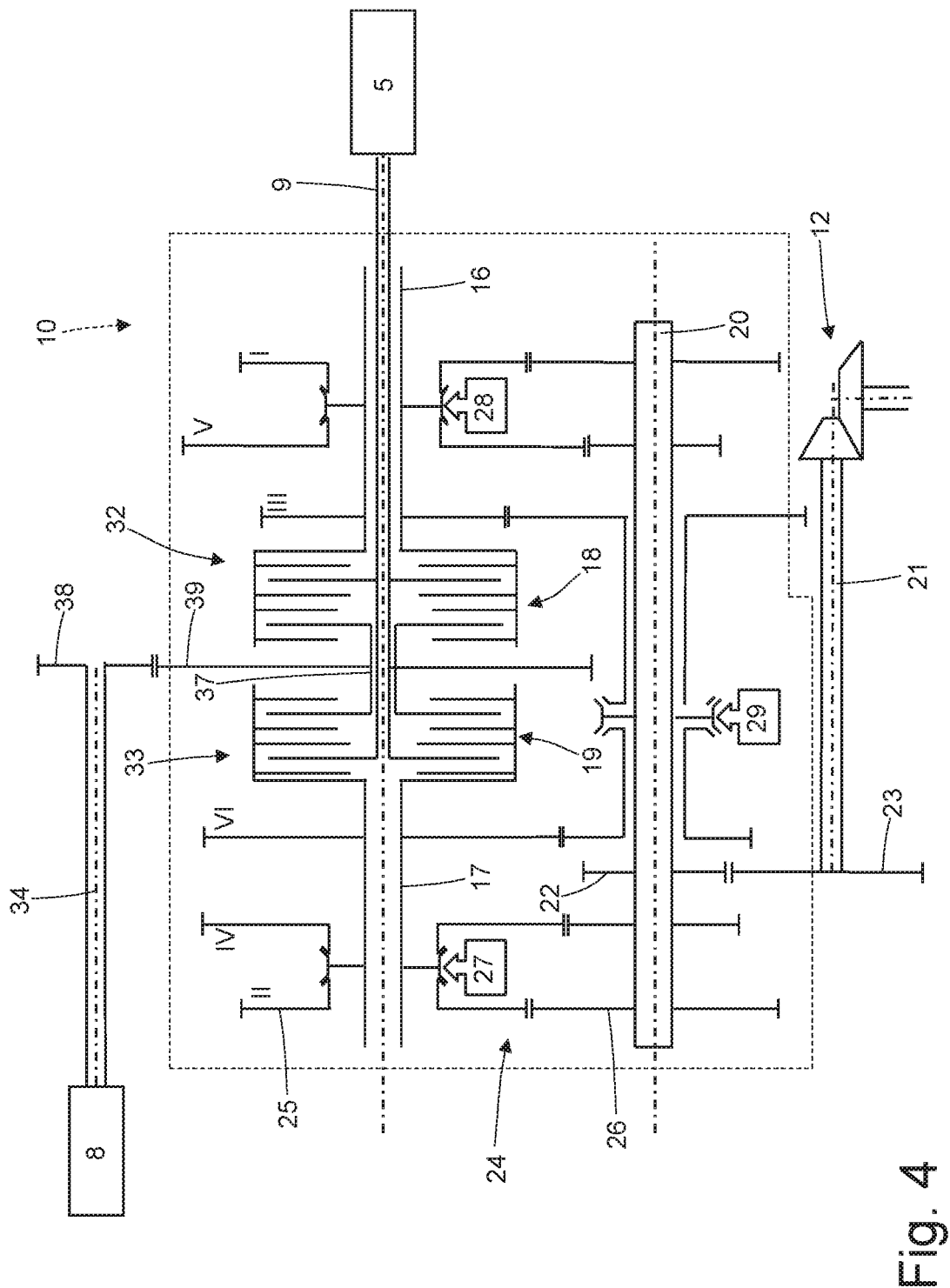

In the embodiment shown in FIG. 4, there is the intermediate shaft 37, the two clutches 18 and 32 are coupled to one another (namely, are mounted together so as to form one single unit), the two clutches 19 and 33 are coupled to one another (namely, are mounted together so as to form one single unit) and the two clutches 18 and 32 are coaxial to the two clutches 19 and 33 and are arranged at opposite ends of the intermediate shaft 37. However, unlike the embodiment shown in FIG. 3, the primary shafts 16 and 17 are spaced farther apart from one another and the intermediate shaft 37 is much shorter, so as to be arranged between the two primary shafts 16 and 17 (namely, the intermediate shaft 37 is no longer arranged inside the primary shafts 16 and 17, but it is arranged between the primary shafts 16 and 17 and on the outside of the primary shafts 16 and 17).

The embodiment shown in FIG. 2 has the clear advantage that it can be easily manufactured even starting from an existing dual-clutch transmission 10 (namely, a transmission which was originally designed for a vehicle without electric machine). The embodiments shown in FIGS. 3 and 4 allow for a greater compactness and a better distribution of masses thanks to the fact that all clutches 18-19 and 32-33 are coaxial to one another. The embodiment shown in FIG. 4 has the advantage of never having three shafts inside one another, but is affected by the drawback of having all clutches 18-19 and 32-33 arranged at the centre (hence, between the gearings 24), so that they are more hardly accessible from the outside.

The embodiments described herein can be combined with one another, without for this reason going beyond the scope of protection of the invention.

The road vehicle 1 described above has numerous advantages.

First of all, the road vehicle 1 described above allows the dual-clutch transmission 10 to be connected to one single electric machine 8 (which can be excluded), which can be used to start the internal combustion heat engine 5, to obtain a hybrid drive, to obtain an electric drive, to carry out a regenerative braking. Furthermore, the electric machine 8 is connected to the rear drive wheels 3 through the gears of the transmission 10 and, hence, the rpm of the electric machine 8 is always kept at ideal values (in particular, values that are not too high); in this way, the sizing of the electric machine 8 maximizes the energetic efficiency of the electric machine 8, though keeping manufacturing costs relatively low.

In other words, the dual-clutch transmission 10 of the road vehicle 1 described above allows for a simple, effective and efficient connection of the electric machine 8, which, alone, can fulfil all tasks (starting of the internal combustion heat engine 5, combined drive, electric drive, regenerative braking, generation of electric energy).

Furthermore, the dual-clutch transmission 10 of the road vehicle 1 described above is particularly compact and light, since it consists of a small number of parts (compared to a similar, known dual-clutch transmission, the sole pair of clutches 32 and 33 was added).

LIST OF THE REFERENCE NUMBERS OF THE FIGS

1 road vehicle
2 front wheels
3 rear wheels
4 powertrain system
5 engine
6 crankshaft
7 drivetrain
8 electric machine
9 drive shaft
10 transmission
11 axle shafts
12 differential
13 electronic power converter
14 power storage system
15 electronic control unit
16 primary shaft
17 primary shaft
18 clutch
19 clutch
20 secondary shaft
21 input shaft
22 gear wheel
23 gear wheel
24 gearing 25 primary gear wheel
26 secondary gear wheel
27 synchronizer
28 synchronizer
29 synchronizer
30 connection shaft
31 connection shaft
32 clutch
33 clutch
34 shaft
35 gear wheel
36 gear wheel
37 intermediate shaft
38 gear wheel
39 gear wheel

The invention claimed is:

1. A road vehicle (1) with hybrid drive comprising:
   at least one pair of drive wheels (3);
   an internal combustion heat engine (5);
   a dual-clutch transmission (10) comprising: a first primary shaft (16) and a second primary shaft (17); a first clutch (18) interposed between the internal combustion heat engine (5) and the first primary shaft (16); a second clutch (18) interposed between the internal combustion heat engine (5) and the second primary shaft (16); at least one secondary shaft (20) permanently driving the drive wheels (3); a plurality of first gearings (24), each defining a respective gear and comprising a primary gear wheel (25), which is mounted on one of the first and second primary shafts (16, 17), and a secondary gear wheel (26), which is mounted on the secondary shaft (20) and permanently meshes with the primary gear wheel (25); and a plurality of synchronizers (27, 28, 29), each mounted on one of the first and second primary shafts (16, 17) and designed to fit at least one corresponding primary gear wheel (25) to one of the first and second primary shafts (16, 17), or mounted on the secondary shaft (20) and designed to fit at least one corresponding secondary gear wheel (26) to the secondary shaft (20); and
   a reversible electric machine (8) having a shaft (34), which can be connected to at least one the first and second primary shafts (16, 17) of the dual-clutch transmission (10);
   wherein the dual-clutch transmission (10) further comprises: an intermediate shaft (37), which is coaxial the first and second primary shafts (16, 17) and is permanently connected to the shaft (34) of the electric machine (8) so that a rotation of the intermediate shaft (37) is directly affected by a rotation of the shaft (34) of the electric machine (8) and vice versa; a third clutch (32), which is interposed between the intermediate shaft (37) and the first primary shaft (16) so as to connect/disconnect the intermediate shaft (37) to/from the first primary shaft (16); and a fourth clutch (33), which is interposed between the intermediate shaft (37) and the second primary shaft (17) so as to connect/disconnect the intermediate shaft (37) to/from the second primary shaft (17);
   wherein all clutches (18, 19, 32, 33) are coaxial to one another;
   wherein the intermediate shaft (37) is directly connected to the third clutch (32) and to the fourth clutch (33);
   wherein the first clutch (18) is coaxial and coupled to the third clutch (32) so as to form one single unit with the third clutch (32);
   wherein the second clutch (19) is coaxial and coupled to the fourth clutch (33) so as to form one single unit with the fourth clutch (33);
   wherein the dual-clutch transmission (10) comprises a third gearing, which connects the shaft (34) of the electric machine (8) to the intermediate shaft (37) and comprises a second gear wheel (38) splined to the shaft (34) of the electric machine (8), and a third gear wheel (39) splined to the intermediate shaft (37);
   wherein the first and second primary shafts (16, 17) are coaxial to one another, face one another head to head, and are axially spaced apart from one another; and
   wherein the third gear wheel (39) is arranged between the first and second primary shafts (16, 17).

2. A road vehicle (1) according to claim 1, wherein the intermediate shaft (37) is internally hollow and houses, on the inside, a drive shaft (9), which receives/transmits the motion to the internal combustion heat engine (5).

3. A road vehicle (1) according to claim 2, wherein both the first and second primary shafts (16, 17) are hollow and house, on the inside, both the intermediate shaft (37) and the drive shaft (9).

4. A road vehicle (1) according to claim 2, wherein the intermediate shaft (37) is completely arranged on the outside of the first and second primary shafts (16, 17) and at an axial distance other than zero from the first and second primary shafts (16, 17).

5. A road vehicle (1) according to claim 1, wherein the unit consisting of the first clutch (18) and the third clutch (32) and the unit consisting of the second clutch (19) and the fourth clutch (33) are arranged at opposite ends of the intermediate shaft (37).

6. A road vehicle (1) according to claim 1, wherein:
   a first synchronizer (29) is arranged in a central position around the secondary shaft (20);
   two second synchronizers (27, 28) are arranged in a lateral position around the corresponding primary shafts (16, 17).

7. A road vehicle (1) with hybrid drive comprising:
   at least one pair of drive wheels (3);
   an internal combustion heat engine (5);
   a dual-clutch transmission (10) comprising: a first primary shaft (16) and a second primary shaft (17); a first clutch (18) interposed between the internal combustion heat engine (5) and the first primary shaft (16); a second clutch (18) interposed between the internal combustion heat engine (5) and the second primary shaft (16); at least one secondary shaft (20) permanently driving the drive wheels (3); a plurality of first gearings (24), each defining a respective gear and comprising a primary gear wheel (25), which is mounted on one of the first and second primary shafts (16, 17), and a secondary gear wheel (26), which is mounted on the secondary shaft (20) and permanently meshes with the primary gear wheel (25); and a plurality of synchronizers (27, 28, 29), each mounted on one of the first and second primary shafts (16, 17) and designed to fit at least one corresponding primary gear wheel (25) to one of the first and second primary shafts (16, 17), or mounted on the secondary shaft (20) and designed to fit at least one corresponding secondary gear wheel (26) to the secondary shaft (20); and
   a reversible electric machine (8) having a shaft (34), which can be connected to at least one the first and second primary shafts (16, 17) of the dual-clutch transmission (10);

wherein the dual-clutch transmission (10) further comprises: an intermediate shaft (37), which is coaxial the first and second primary shafts (16, 17) and is permanently connected to the shaft (34) of the electric machine (8) so that a rotation of the intermediate shaft (37) is directly affected by a rotation of the shaft (34) of the electric machine (8) and vice versa; a third clutch (32), which is interposed between the intermediate shaft (37) and the first primary shaft (16) so as to connect/disconnect the intermediate shaft (37) to/from the first primary shaft (16); and a fourth clutch (33), which is interposed between the intermediate shaft (37) and the second primary shaft (17) so as to connect/disconnect the intermediate shaft (37) to/from the second primary shaft (17);

wherein all clutches (18, 19, 32, 33) are coaxial to one another;

wherein the intermediate shaft (37) is directly connected to the third clutch (32) and to the fourth clutch (33);

wherein the first clutch (18) is coaxial and coupled to the third clutch (32) so as to form one single unit with the third clutch (32);

wherein the second clutch (19) is coaxial and coupled to the fourth clutch (33) so as to form one single unit with the fourth clutch (33); and wherein the intermediate shaft (37) is internally hollow and houses, on the inside, a drive shaft (9), which receives/transmits the motion to the internal combustion heat engine (5).

8. A road vehicle (1) according to claim 7, wherein both the first and second primary shafts (16, 17) are hollow and house, on the inside, both the intermediate shaft (37) and the drive shaft (9).

9. A road vehicle (1) according to claim 7, wherein the dual-clutch transmission (10) comprises a third gearing, which connects the shaft (34) of the electric machine (8) to the intermediate shaft (37) and comprises a second gear wheel (38) splined to the shaft (34) of the electric machine (8), and a third gear wheel (39) splined to the intermediate shaft (37).

10. A road vehicle (1) according to claim 9, wherein:
the first and second primary shafts (16, 17) are coaxial to one another, face one another head to head, and are axially spaced apart from one another; and
the third gear wheel (39) is arranged between the first and second primary shafts (16, 17).

11. A road vehicle (1) according to claim 7, wherein the unit consisting of the first clutch (18) and the third clutch (32) and the unit consisting of the second clutch (19) and the fourth clutch (33) are arranged at opposite ends of the intermediate shaft (37).

12. A road vehicle (1) according to claim 7, wherein:
a first synchronizer (29) is arranged in a central position around the secondary shaft (20);
two second synchronizers (27, 28) are arranged in a lateral position around the corresponding primary shafts (16, 17).

13. A road vehicle (1) with hybrid drive comprising:
at least one pair of drive wheels (3);
an internal combustion heat engine (5);
a dual-clutch transmission (10) comprising: a first primary shaft (16) and a second primary shaft (17); a first clutch (18) interposed between the internal combustion heat engine (5) and the first primary shaft (16); a second clutch (18) interposed between the internal combustion heat engine (5) and the second primary shaft (16); at least one secondary shaft (20) permanently driving the drive wheels (3); a plurality of first gearings (24), each defining a respective gear and comprising a primary gear wheel (25), which is mounted on one of the first and second primary shafts (16, 17), and a secondary gear wheel (26), which is mounted on the secondary shaft (20) and permanently meshes with the primary gear wheel (25); and a plurality of synchronizers (27, 28, 29), each mounted on one of the first and second primary shafts (16, 17) and designed to fit at least one corresponding primary gear wheel (25) to one of the first and second primary shafts (16, 17), or mounted on the secondary shaft (20) and designed to fit at least one corresponding secondary gear wheel (26) to the secondary shaft (20); and a reversible electric machine (8) having a shaft (34), which can be connected to at least one the first and second primary shafts (16, 17) of the dual-clutch transmission (10);

wherein the dual-clutch transmission (10) further comprises: an intermediate shaft (37), which is coaxial the first and second primary shafts (16, 17) and is permanently connected to the shaft (34) of the electric machine (8) so that a rotation of the intermediate shaft (37) is directly affected by a rotation of the shaft (34) of the electric machine (8) and vice versa; a third clutch (32), which is interposed between the intermediate shaft (37) and the first primary shaft (16) so as to connect/disconnect the intermediate shaft (37) to/from the first primary shaft (16); and a fourth clutch (33), which is interposed between the intermediate shaft (37) and the second primary shaft (17) so as to connect/disconnect the intermediate shaft (37) to/from the second primary shaft (17);

wherein all clutches (18, 19, 32, 33) are coaxial to one another;

wherein the intermediate shaft (37) is directly connected to the third clutch (32) and to the fourth clutch (33);

wherein the first clutch (18) is coaxial and coupled to the third clutch (32) so as to form one single unit with the third clutch (32);

wherein the second clutch (19) is coaxial and coupled to the fourth clutch (33) so as to form one single unit with the fourth clutch (33); and wherein the unit consisting of the first clutch (18) and the third clutch (32) and the unit consisting of the second clutch (19) and the fourth clutch (33) are arranged at opposite ends of the intermediate shaft (37).

14. A road vehicle (1) according to claim 13, wherein both the first and second primary shafts (16, 17) are hollow and house, on the inside, both the intermediate shaft (37) and the drive shaft (9).

15. A road vehicle (1) according to claim 13, wherein the dual-clutch transmission (10) comprises a third gearing, which connects the shaft (34) of the electric machine (8) to the intermediate shaft (37) and comprises a second gear wheel (38) splined to the shaft (34) of the electric machine (8), and a third gear wheel (39) splined to the intermediate shaft (37).

16. A road vehicle (1) according to claim 15, wherein:
the first and second primary shafts (16, 17) are coaxial to one another, face one another head to head, and are axially spaced apart from one another; and
the third gear wheel (39) is arranged between the first and second primary shafts (16, 17).

17. A road vehicle (1) according to claim 13, wherein the intermediate shaft (37) is internally hollow and houses, on the inside, a drive shaft (9), which receives/transmits the motion to the internal combustion heat engine (5).

18. A road vehicle (1) according to claim 13, wherein:
a first synchronizer (29) is arranged in a central position around the secondary shaft (20);
two second synchronizers (27, 28) are arranged in a lateral position around the corresponding primary shafts (16, 17).

19. A road vehicle (1) with hybrid drive comprising:
at least one pair of drive wheels (3);
an internal combustion heat engine (5);
a dual-clutch transmission (10) comprising: a first primary shaft (16) and a second primary shaft (17); a first clutch (18) interposed between the internal combustion heat engine (5) and the first primary shaft (16); a second clutch (18) interposed between the internal combustion heat engine (5) and the second primary shaft (16); at least one secondary shaft (20) permanently driving the drive wheels (3); a plurality of first gearings (24), each defining a respective gear and comprising a primary gear wheel (25), which is mounted on one of the first and second primary shafts (16, 17), and a secondary gear wheel (26), which is mounted on the secondary shaft (20) and permanently meshes with the primary gear wheel (25); and a plurality of synchronizers (27, 28, 29), each mounted on one of the first and second primary shafts (16, 17) and designed to fit at least one corresponding primary gear wheel (25) to one of the first and second primary shafts (16, 17), or mounted on the secondary shaft (20) and designed to fit at least one corresponding secondary gear wheel (26) to the secondary shaft (20); and
a reversible electric machine (8) having a shaft (34), which can be connected to at least one the first and second primary shafts (16, 17) of the dual-clutch transmission (10);
wherein the dual-clutch transmission (10) further comprises: an intermediate shaft (37), which is coaxial the first and second primary shafts (16, 17) and is permanently connected to the shaft (34) of the electric machine (8) so that a rotation of the intermediate shaft (37) is directly affected by a rotation of the shaft (34) of the electric machine (8) and vice versa; a third clutch (32), which is interposed between the intermediate shaft (37) and the first primary shaft (16) so as to connect/disconnect the intermediate shaft (37) to/from the first primary shaft (16); and a fourth clutch (33), which is interposed between the intermediate shaft (37) and the second primary shaft (17) so as to connect/disconnect the intermediate shaft (37) to/from the second primary shaft (17);
wherein all clutches (18, 19, 32, 33) are coaxial to one another;
wherein the intermediate shaft (37) is directly connected to the third clutch (32) and to the fourth clutch (33);
wherein the first clutch (18) is coaxial to the third clutch (32) and is mounted together with the third clutch (32) so as to form one single unit with the third clutch (32) and so as the first clutch (18) is arranged closer to the third clutch (32) than to the second clutch (19); and
wherein the second clutch (19) is coaxial to the fourth clutch (33) and is mounted together with the fourth clutch (33) so as to form one single unit with the fourth clutch (33) and so as the second clutch (19) is arranged closer to the fourth clutch (33) than to the first clutch (18).

20. A road vehicle (1) according to claim 19, wherein the dual-clutch transmission (10) comprises a third gearing, which connects the shaft (34) of the electric machine (8) to the intermediate shaft (37) and comprises a second gear wheel (38) splined to the shaft (34) of the electric machine (8), and a third gear wheel (39) splined to the intermediate shaft (37).

21. A road vehicle (1) according to claim 20, wherein:
the first and second primary shafts (16, 17) are coaxial to one another, face one another head to head, and are axially spaced apart from one another; and
the third gear wheel (39) is arranged between the first and second primary shafts (16, 17).

22. A road vehicle (1) according to claim 19, wherein the intermediate shaft (37) is internally hollow and houses, on the inside, a drive shaft (9), which receives/transmits the motion to the internal combustion heat engine (5).

23. A road vehicle (1) according to claim 22, wherein both the first and second primary shafts (16, 17) are hollow and house, on the inside, both the intermediate shaft (37) and the drive shaft (9).

24. A road vehicle (1) according to claim 19, wherein the unit consisting of the first clutch (18) and the third clutch (32) and the unit consisting of the second clutch (19) and the fourth clutch (33) are arranged at opposite ends of the intermediate shaft (37).

25. A road vehicle (1) according to claim 19, wherein:
a first synchronizer (29) is arranged in a central position around the secondary shaft (20); and two second synchronizers (27, 28) are arranged in a lateral position around the corresponding primary shafts (16, 17).

* * * * *